(12) United States Patent
Pechtold

(10) Patent No.: US 7,971,798 B2
(45) Date of Patent: Jul. 5, 2011

(54) RESETTABLE THERMAL PRESSURE RELIEF DEVICE

(75) Inventor: Rainer Pechtold, Huenstetten (DE)

(73) Assignee: GM Global Technology Operations LLC, Detroit, MI (US)

( * ) Notice: Subject to any disclaimer, the term of this patent is extended or adjusted under 35 U.S.C. 154(b) by 569 days.

(21) Appl. No.: 12/116,321

(22) Filed: May 7, 2008

(65) Prior Publication Data

US 2009/0277515 A1    Nov. 12, 2009

(51) Int. Cl.
    *G05D 23/12*    (2006.01)
(52) U.S. Cl. ....... 236/100; 236/93 A; 236/99 J; 137/457
(58) Field of Classification Search .............. 236/61, 236/64, 99 R, 99 G, 100, 93 A, 93 R, 99 J; 137/457, 468; 429/442
    See application file for complete search history.

(56) References Cited

U.S. PATENT DOCUMENTS

| | | | | |
|---|---|---|---|---|
| 3,838,812 A * | 10/1974 | Johnson | ...................... | 236/99 R |
| 4,027,481 A * | 6/1977 | Hunt | ............................... | 60/533 |
| 4,957,136 A * | 9/1990 | Gavrila | ........................ | 137/488 |
| 5,161,738 A * | 11/1992 | Wass | ........................... | 236/92 C |
| 5,197,671 A * | 3/1993 | Wass et al. | .................. | 236/92 C |
| 5,213,128 A * | 5/1993 | Baird | ............................... | 137/73 |
| 5,285,998 A * | 2/1994 | Zink et al. | ..................... | 251/144 |
| 5,577,532 A * | 11/1996 | Palmer | ......................... | 137/460 |
| 5,642,859 A * | 7/1997 | Ackroyd | ..................... | 236/93 B |
| 5,647,390 A * | 7/1997 | Wass | .......................... | 137/68.12 |
| 5,788,212 A * | 8/1998 | Hackman et al. | ............... | 251/11 |
| 6,382,232 B1 * | 5/2002 | Portmann | .................. | 137/68.13 |
| 6,460,564 B1 * | 10/2002 | Rief et al. | ..................... | 137/456 |
| 6,866,057 B1 * | 3/2005 | Buehrle, II | ..................... | 137/74 |
| 2006/0260692 A1 * | 11/2006 | Pechtold | .................. | 137/505.42 |
| 2007/0204915 A1 * | 9/2007 | Kimbara et al. | ............. | 137/495 |
| 2009/0301581 A1 * | 12/2009 | MacNeal et al. | ......... | 137/505.14 |

* cited by examiner

*Primary Examiner* — Judy J Swann
*Assistant Examiner* — Paolo Gonzalez
(74) *Attorney, Agent, or Firm* — Fraser Clemens Martin & Miller LLC; J. Douglas Miller

(57) ABSTRACT

A resettable thermal pressure relief device (TPRD) is disclosed. The TPRD includes a piston, a housing adapted to receive the piston and allow movement between an open and a closed position. The housing includes an actuator having a temperature sensitive material disposed therein. The temperature sensitive material volumetrically expands, increasing a length of the actuator and forcing a lever from a first position to a second position. The piston is held in the closed position by the lever in the first position. When the lever moves to the second position, the piston is allowed to move to the open position, allowing a fluid to flow through the TPRD from a high pressure vessel in communication therewith.

14 Claims, 4 Drawing Sheets

RESETTABLE THERMAL PRESSURE RELIEF DEVICE

FIELD OF THE INVENTION

The disclosure relates to a thermal pressure relief device (TPRD) and, more particularly, to a resettable TPRD for a high pressure vessel.

BACKGROUND OF THE INVENTION

The fuel cell has been proposed as a clean, efficient and environmentally responsible power source for various applications. A plurality of fuel cells may be arranged to form a fuel cell stack capable of powering an electric vehicle. One example of the fuel cell is a Proton Exchange Membrane (PEM) fuel cell. In the PEM fuel cell, hydrogen is supplied as a fuel to an anode and oxygen is supplied as an oxidant to a cathode. A common technique for storing hydrogen is in a lightweight, high pressure vessel resistant to puncture.

The typical high pressure vessel includes a thermal pressure relief device (TPRD). The TPRD is in fluid communication with the interior of the vessel and is configured to vent the hydrogen in the vessel when actuated, for example, when a predetermined temperature is attained. The predetermined temperature may be attained during an operation of the vessel.

The typical TPRD is "one way", meaning that the device may only be operated once. Following such operation, the TPRD is destroyed and must be replaced. However, it is desirable to employ quality control testing and inspection to verify that the TPRD is operating properly. It is presently not possible to test a TPRD, reset the TPRD, and subsequently install the tested TPRD in a high pressure vessel.

Another known pressure relief device is disclosed in U.S. Pat. No. 5,788,212, hereby incorporated herein by reference in its entirety. The pressure relief device has a thermally actuated trigger mechanism that interferes with a movement of a valve closure element. The trigger mechanism is elongated and shortens when heated to a set temperature, eliminating the interference with the closure element and actuating the pressure relief device.

There is a continuing need for a TPRD which can be tested, reset and subsequently installed in a high pressure vessel for use with a fuel cell stack. Desirably, the TPRD may be manually reset following the testing, improve security of a high pressure vessel, and have a manufacturing cost that does not substantially exceed the cost of existing pressure relief devices.

SUMMARY OF THE INVENTION

In concordance with the instant disclosure, a TPRD that can be tested, manually reset, and installed in a high pressure vessel, that improves the security of the high pressure vessel, and that has a manufacturing cost that does not substantially exceed the cost of existing pressure relief devices, is surprisingly discovered.

In one embodiment, a resettable thermal pressure relief device (TPRD) includes a housing having a first aperture and a second aperture. The housing allows a fluid to flow therethrough, for example, from a high pressure vessel. The TPRD includes a piston slidably mounted in the housing and movable between an open position and a closed position. The piston seals the second aperture when the piston is disposed in the closed position. A lever is disposed in the housing and has a first position substantially above the piston which selectively militates against the piston moving into the open position. An actuator having a temperature sensitive material is further included in the TPRD. The actuator is adapted to expand volumetrically with an increase in temperature. The actuator facilitates a movement of the lever from a first position to a second position when a desired temperature is attained. The piston is thereby allowed to move to the open position for the fluid flow to occur.

In a further embodiment, the TPRD includes a lever spring adapted to bias the lever and selectively militate against a movement of the lever from the first position. The actuator is configured to move the lever from a first position to a second position when a desired temperature is attained to allow the piston to move to the open position.

In another embodiment, the TPRD includes a lever spring adapted to bias the lever against the housing and selectively move the lever to the second position. The actuator facilitates a movement of the lever to the second position when a desired temperature is attained to allow the piston to move to the open position.

BRIEF DESCRIPTION OF THE DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
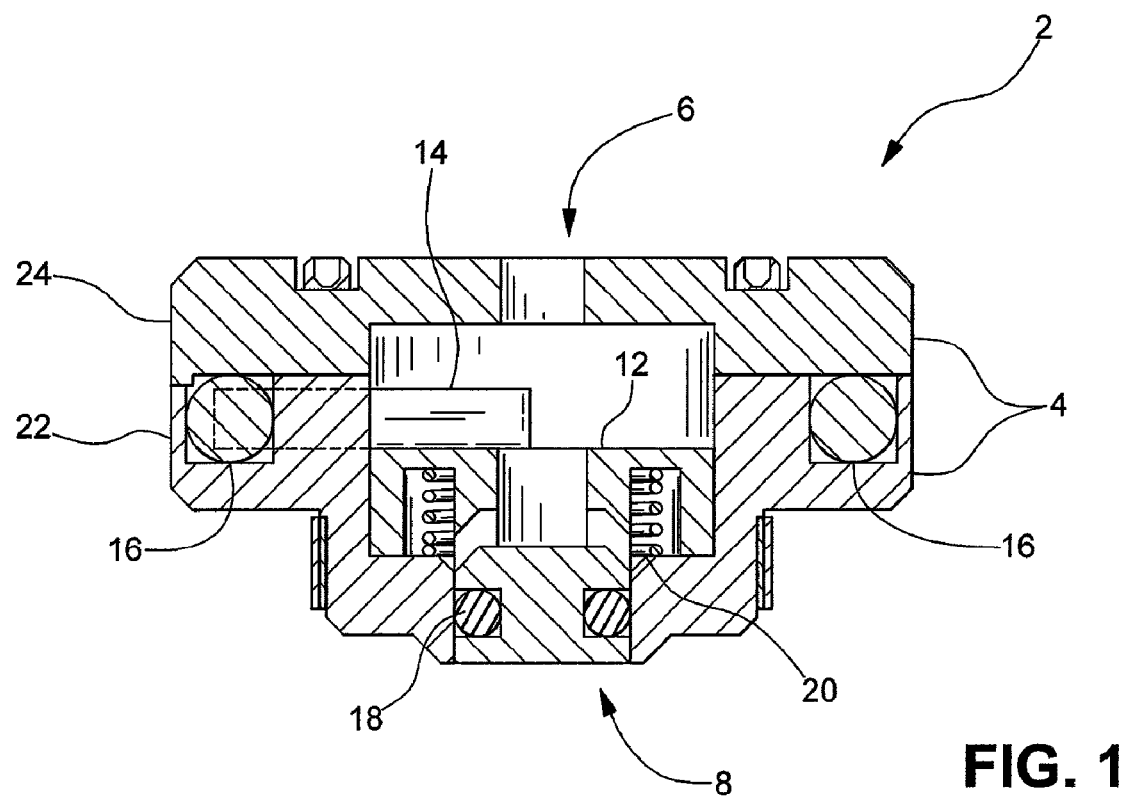
FIG. 1 is a cross-sectional side elevational view of a resettable TPRD, showing a piston in a closed position.
Figure 2:
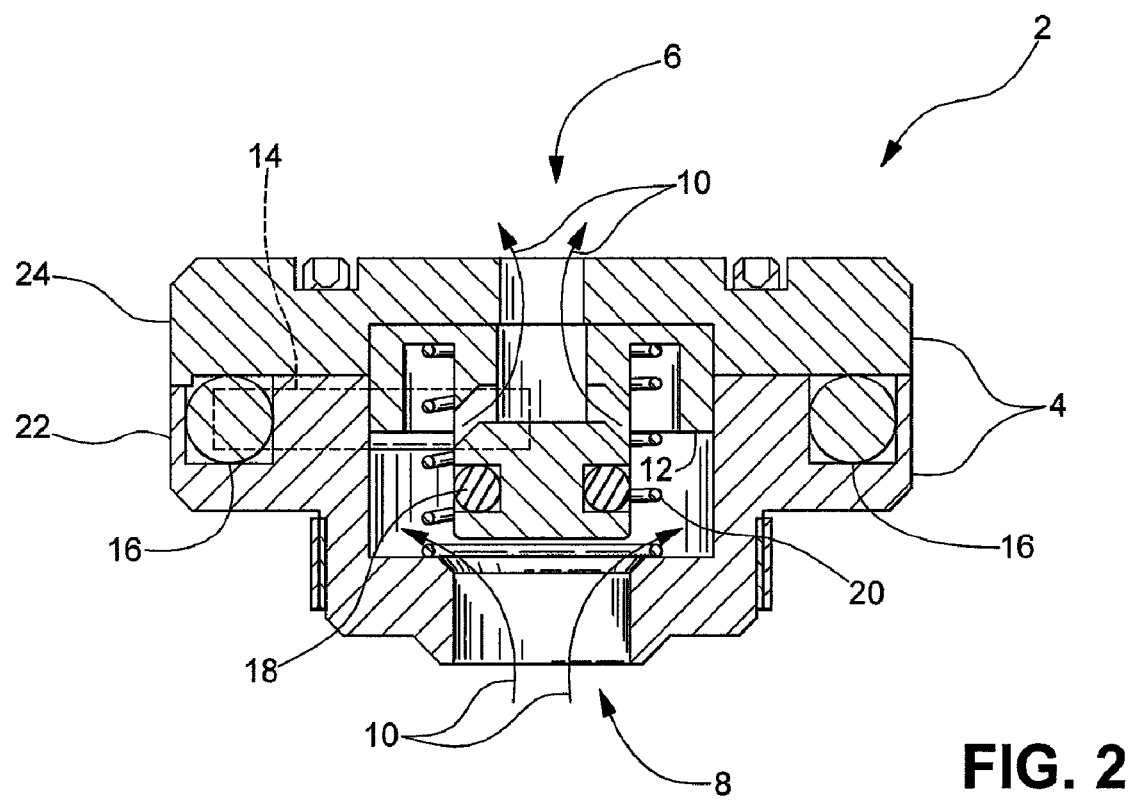
FIG. 2 is a cross-sectional side elevational view of the resettable TPRD illustrated in FIG. 1 and showing the piston in an open position.

In FIGS. 1 and 2, a resettable thermal pressure relief device (TPRD) 2 is shown including a housing 4. The housing 4 includes a first aperture 6 and a second aperture 8. The first and second apertures 6, 8 are configured to allow a fluid 10 to flow through the housing 4. For example, the fluid 10 may flow from a high pressure vessel (not shown) in fluid communication with the second aperture 8 to the ambient atmosphere when the TPRD 2 is actuated as shown in FIG. 2.

The TPRD 2 has a piston 12 slidably disposed in the housing 4. A lever 14 and an actuator 16 are also disposed in the housing 4. The piston 12 is movable between an open position as shown in FIG. 1 and a closed position as shown in FIG. 2. The piston 12 may have at least one aperture formed therein for facilitating the flow of the fluid 10 therethrough when the piston 12 is in the open position. When in the closed position, the piston 12 seals the second aperture 8. The piston 12 may include a sealing member 18 that forms a substantially fluid tight seal between the piston 12 and the housing 4 in the closed position. As a nonlimiting example, the sealing member 18 is an O-ring. The sealing member 18 may be disposed on a surface of the housing 4 forming the second aperture 8, for example. Another suitable sealing member 18 may be employed as desired.

In one embodiment, the TPRD 2 includes a piston spring 20. The piston spring 20 urges the piston 12 toward the open position. A skilled artisan should appreciate that other suitable means for moving the piston 12 between the closed and open positions may be employed.

In the TPRD 2 of the present disclosure, the lever 14 may have a first position substantially above the piston 12. The first position militates against the movement of the piston 12 into the open position. The lever 14 is movable to a second position. The second position of the lever 14 allows the piston 12 to move to the open position, for example, under force from the piston spring 20. The piston 12 may thereby selectively facilitate the fluid 10 from the high pressure vessel.

The movement of the lever 14 from the first position to the second position may be caused by, or be an indirect result of, a movement of the actuator 16. In a particularly illustrative embodiment, the actuator 16 of the disclosure includes a temperature sensitive material. The temperature sensitive material is adapted to expand volumetrically with an increase in temperature. The temperature sensitive material can expand linearly or non-linearly, as desired. As a nonlimiting example, the temperature sensitive material may one of expand linearly with temperature and expand primarily within a defined temperature range. The temperature sensitive material may be a wax, for example. Other suitable temperature sensitive materials may also be selected. The housing 4 may be formed from a thermally conductive material adapted to transfer heat from the ambient environment adjacent the TPRD 2 to the temperature sensitive material.

During an operation of the TPRD 2, the actuator 16 moves the lever 14 from the first position to the second position when a desired temperature is attained. The desired temperature may be a temperature that causes an undesirable high internal pressure or a reduced structural integrity of the high pressure vessel, for example. A suitable desired temperature associated with the particular high pressure vessel may be selected by a skilled artisan as desired.

It should be understood that the flow of the fluid 10 enabled by the movement of the piston 12 from the closed position to the open position is substantially non-destructive. The TPRD 2 may be reset for reuse following the fluid flow or discharge, for example, by a manual moving of the piston 12 to the closed position. As a nonlimiting example, the housing 4 may include a housing body 22 removably coupled with a housing cap 24. The housing body 22 may be configured for threadable engagement with the high pressure vessel, for example. The TPRD 2 may be placed in fluid communication with an on-tank valve (OTV), for example, as is known in the art. The OTV may be mounted to the high pressure vessel and include additional components, such as an automatic shut-off valve, a manual valve, a temperature sensor, and a pressure sensor. Other suitable means for placing the TRPD 2 in fluid communication with the high pressure vessel may also be employed.

The housing body 22 and the housing cap 24 may include threads that facilitate a threaded cooperation therebetween. The housing body 22 and the housing cap 24 may be press fit together, if desired. It should be understood that regardless of the particular means for coupling the housing body 22 and the housing cap 24, a fluid tight seal between the housing body 22 and the housing cap 24 may or may not be formed, as desired. In one particular embodiment, a substantially fluid tight seal is formed therebetween that militates against the fluid 10 from the TPRD 2 other than through the first aperture 6.

The housing cap 24 may be removed from the housing body 22 following the fluid flow to facilitate an ease in manual resetting of the TPRD 2. In a nonlimiting example, the first aperture 6 is disposed adjacent the piston 12 to permit a manual resetting of the piston 12 following the fluid 10. The manual resetting of the TPRD may be performed by at least one of physically pushing the piston 12 into the closed position, and blowing compressed air into the TPRD 2 at a sufficiently high flow rate to force the piston 12 into the closed position.

A skilled artisan should further appreciate that the TPRD 2 may include a discharge pipe (not shown) in fluid communication with the first aperture. The discharge pipe is configured to direct the fluid 10 away from the TPRD 2 upon activation of the TPRD 2. Illustratively, the discharge pipe may be removable to facilitate the resetting of the TPRD 2 after operation.

Various embodiments of the TPRD 2 according to the present disclosure are shown in FIGS. 3 to 8. Like or similar structure repeated between FIGS. 1 to 8 is shown with a prime (') symbol, a double-prime (") symbol, or a triple-prime symbol ("') for purpose of clarity.

Figure 3:
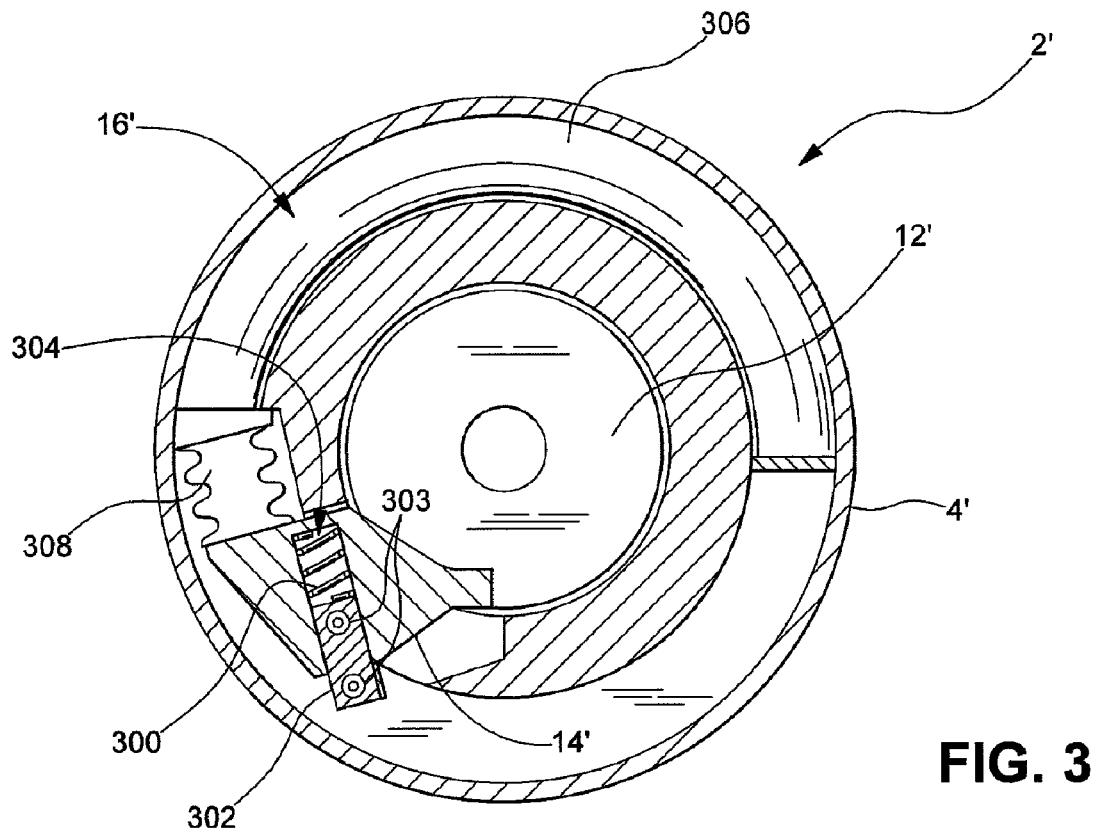
FIG. 3 is a top plan view of the resettable TPRD illustrated in FIGS. 1 and 2 with a housing cap removed and showing a lever holding the piston in the closed position.
Figure 4:
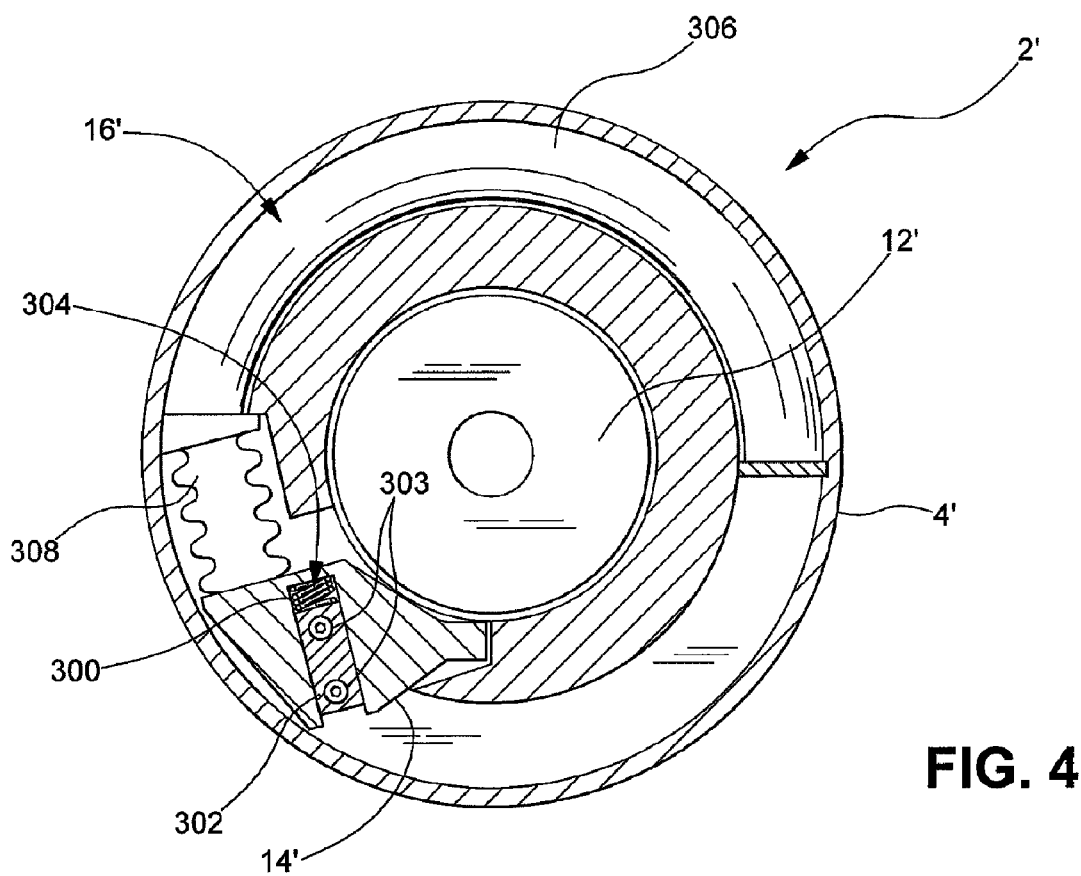
FIG. 4 is a top plan view of the resettable TPRD illustrated in FIGS. 1 and 2 with a housing cap removed and showing a released lever and the piston in the open position.

As shown in FIG. 3, the TPRD 2' includes the lever 14' in the first position. The lever 14' is positioned above the piston 12' in the first position. The lever 14' militates against a movement of the piston 12' to the open position where the fluid 10' from the high pressure vessel occurs. As shown in FIG. 4, the lever 14' is moved to the second position by the actuator 16' to allow the piston 12' to move to the open position.

The TPRD 2' includes a lever spring 300. The lever spring 300 may be coupled to one of the lever 14' and the housing 4'. The lever spring 300 biases the lever 14' against the housing 4', for example. The lever spring 300 militates against a movement of the lever 14' from the first position to the second position. When the TPRD 2' is actuated, the lever spring 300 is compressed by the actuator 16' thereto until the actuator 16' sufficiently compresses the lever spring 300 to provide the lever 14' in the second position.

The TPRD 2' may include a guide 302. As a nonlimiting example, the guide 302 is coupled to at least one of the lever spring 300 and the housing 4'. For example, the guide 302 may be coupled to the housing with one or more fasteners 303. The guide 300 may facilitate a substantially linear movement of the lever 14' when the actuator 16' moves the guide from the first position to the second position. As a nonlimiting example, the lever 14' may include a cavity 304. The cavity 304 may be a groove or a notch formed in the lever 14', for example. The cavity may receive at least one of the guide 300 and the lever spring 300.

It should be appreciated that the actuator 16' may be disposed within the housing 4' in any location sufficient for the actuator 16' to apply a force to, and thereby move, the lever 14'. As a nonlimiting example, the actuator 16' includes a tube 306. The tube 306 may have a substantially arcuate shape, although other suitable shapes may also be employed. In certain embodiments, the tube 306 is disposed adjacent a peripheral edge of the housing 4'. Being disposed adjacent the peripheral edge, the tube 306 may be optimally placed to facilitate a transfer of heat through the housing 4' to the temperature sensitive material.

The tube 306 may be formed from an elastic material, for example. The temperature sensitive material may be disposed within the tube 306 and adapted to extend a length of the tube 306 in response to an increase in temperature. The tube 306 may thereby extend in length to move the lever 14' between the first and second positions.

In a further embodiment, the actuator 16' includes a bellows 308. It should be appreciated than an actuator piston may be employed instead of the bellows 308, if desired. The bellows 308 may be disposed adjacent the lever 14'. In one example, the bellows 308 is disposed between the tube 306 and the lever 14'. The bellows 308 may be in fluid communication with the tube 306 to receive the temperature sensitive material upon a volumetric increase thereof with an increase in temperature. The bellows 308 is thereby adapted to extend upon the volumetric increase of the temperature sensitive material and move the lever 14'.

Figure 5:
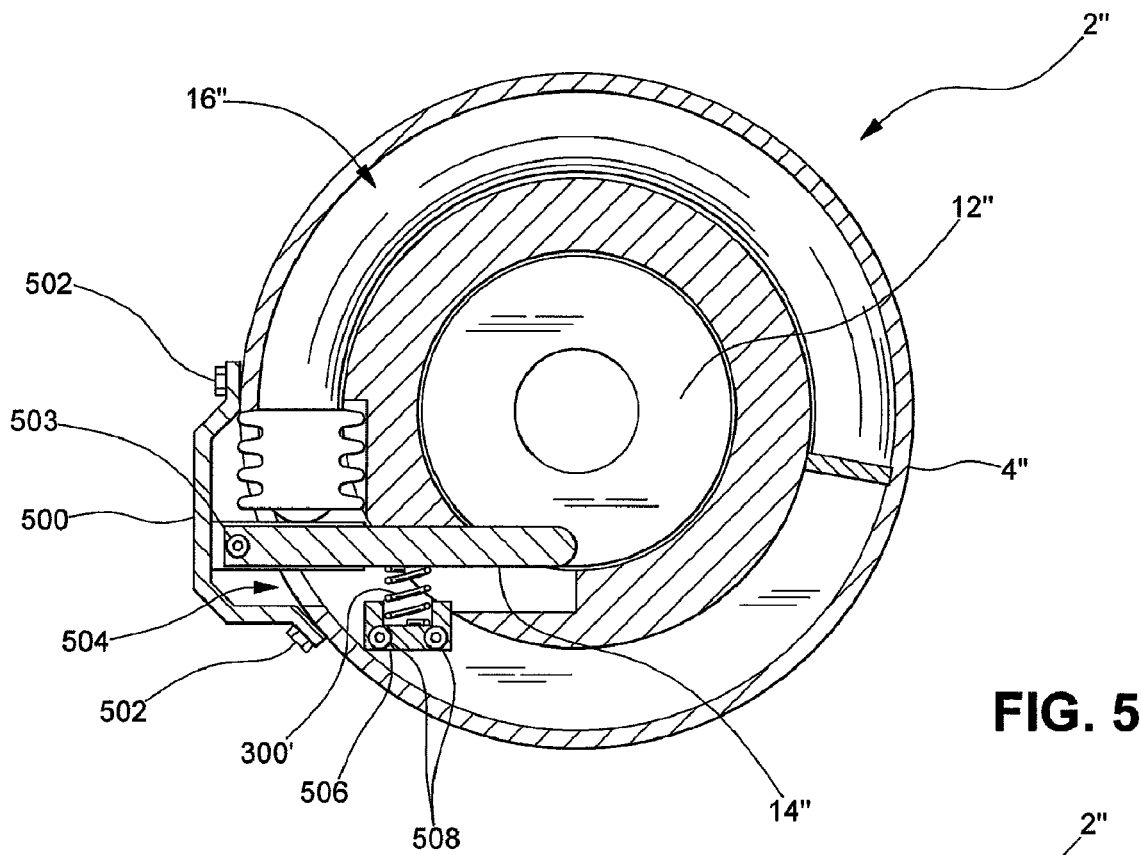
FIG. 5 is a top plan view of the resettable TPRD illustrated in FIGS. 1 and 2, according to another embodiment with a housing cap removed and showing a lever holding the piston in the closed position.
Figure 6:
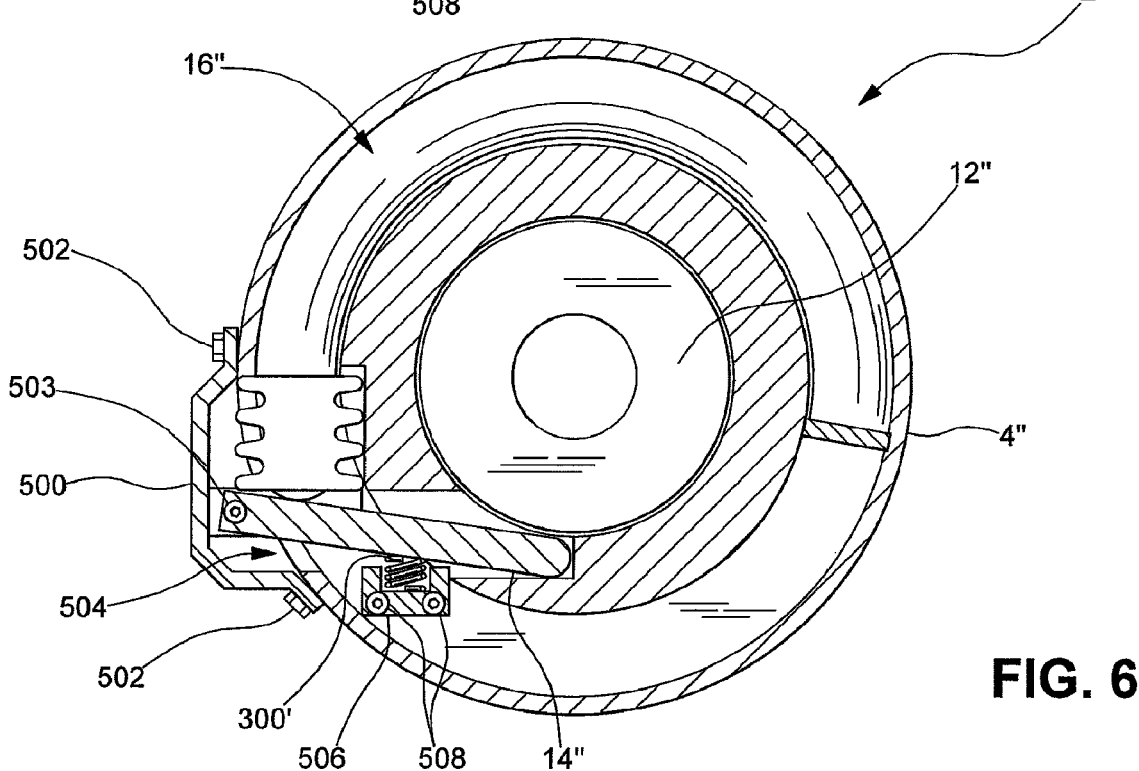
FIG. 6 is a top plan view of the resettable TPRD illustrated in FIGS. 1 and 2, according to another embodiment with a housing cap removed and showing a released lever and the piston in the open position.

Referring now to FIGS. 5 and 6, the TPRD 2" includes the lever 14" disposed over the piston 12" in the first position and pivoted to a side of the piston 12" in the second position. The second position of the lever 14" allows the piston 12" to move from the closed position to the open position as described hereinabove.

The TPRD 2" includes a hinge plate 500 coupled to the housing 4", for example, with one or more hinge plate fasteners 502. The lever 14" is hingedly attached to the hinge plate 500. As a nonlimiting example, the lever 14" may be hingedly attached to the hinge plate 500 with a hinge pin 503. The hinge pin 503 may be disposed through the lever 14" and coupled to the hinge plate 500. The hinge plate 500 facilitates a pivotal movement of the lever 14" when the actuator 16' is extends and contacts the lever 14". For example, the lever 14" is partially disposed in a housing opening 504 that enables the actuator 16" to contact the lever 14" at a position that caused the pivotal movement of the lever 14". The hinge plate 500 further seals the housing opening 504 and militates against the fluid 10 exiting the TPRD 2" during the operation thereof.

The TPRD 2" includes the lever spring 300' for biasing the lever 14". The TPRD 2" may include a biasing plate 506 between which the lever 14" and the lever spring 300' may be disposed. The biasing plate 506 may be formed integrally with the housing 4". In another embodiment, the biasing plate 506 is coupled to the housing 4" with at least one biasing plate fastener 508. Other suitable means for coupling the housing biasing plate 506 with the housing 4" may be employed.

Figure 7:
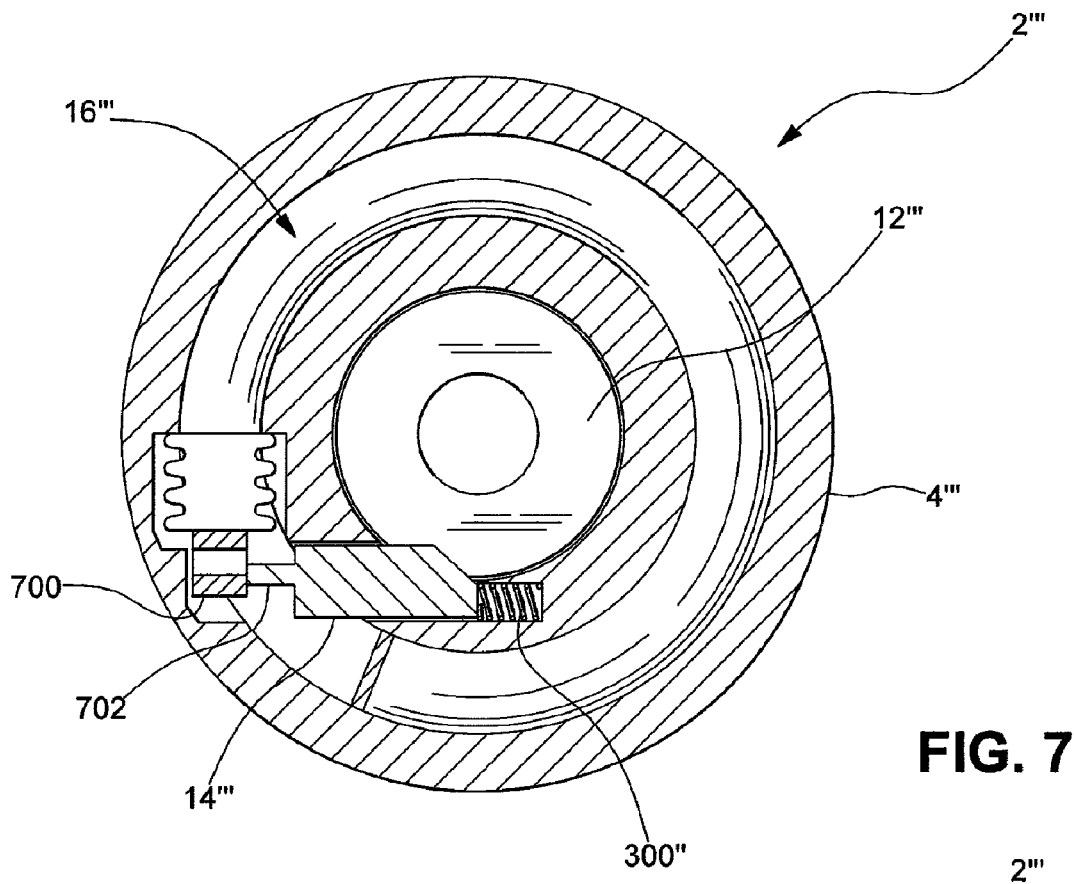
FIG. 7 is a top plan view of the resettable TPRD illustrated in FIGS. 1 and 2, according to a further embodiment with a housing cap removed and showing a lever holding the piston in the closed position.
Figure 8:
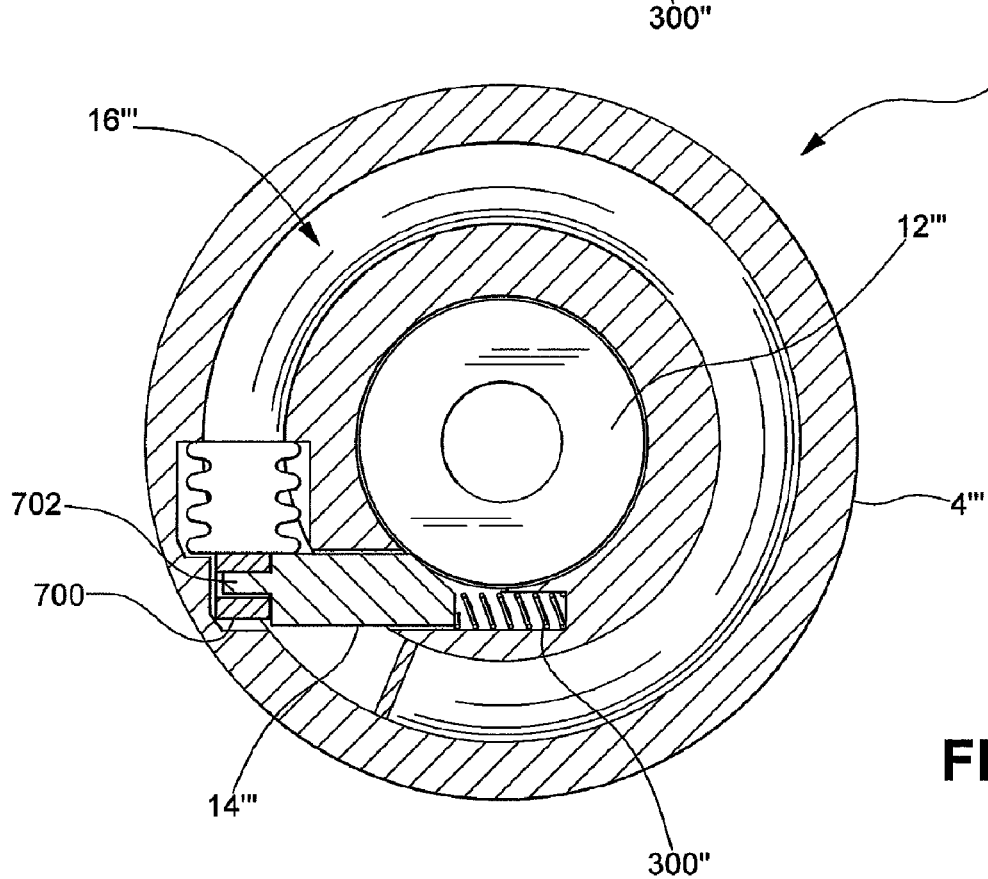
FIG. 8 is a top plan view of the resettable TPRD illustrated in FIGS. 1 and 2, according to a further embodiment with a housing cap removed and showing a lever holding the piston in the open position.

In another embodiment shown in FIGS. 7 and 8, the TPRD 2''' includes the lever spring 300" configured to bias the lever 14''' against the housing 4'''. The lever spring 300''' selectively moves the lever 14''' from the first position where the lever 14''' militates against the movement of the piston 12''' from the closed position, to the second position where the piston 12''' is allowed to move to the open position.

The actuator 16''' facilitates the movement of the lever 14''' from the first position to the second position. As a nonlimiting example, the actuator 16''' may have a collar 700 coupled thereto. The collar 700 is adapted to receive a portion 702 of the lever 14''' when caused to move by the actuator 16''' to a receiving position. Upon moving the collar 700 to the receiving position, the lever spring 300" causes the lever 14''' to move, such as, by sliding the lever portion 702 into the collar 700. The lever 14''' is thereby caused to move to a side of the piston 12''' and allow the piston 12''' to move to the open position.

In contrast to known thermal pressure relief devices that operate exclusively at high internal pressures, one of ordinary skill in the art should understand that the TPRD 2, 2', 2", 2''' of the present disclosure is operable over a range of pressures experienced by typical high pressure vessels. As a nonlimiting example, the range may be between about 10 bar and about 1000 bar, although a skilled artisan should appreciate that exact values are dependent on the design and other known constraints on the high pressure vessel. In particular, even at relatively low internal pressures, the TPRD 2, 2', 2", 2''' operates and opens to allow the fluid 10 from the high pressure vessel. It should also be understood that the piston spring 20 of the present disclosure may be selected to open even at a desired minimum internal pressure where the internal pressure may not be sufficient in and of itself to move the piston 12, 12', 12", 12''' to the open position.

The TPRD 2, 2', 2", 2''' of the present disclosure allows end of line testing of individual TPRD 2, 2', 2", 2''' units after assembly thereof. The tested TPRD 2, 2', 2", 2''' is then reset by forcing the piston 12, 12', 12", 12''' to the closed position. The lever 14, 14', 14", 14''' is one of moved back to the first position by the force of the lever spring 300', 300", 300''', for example, and manually to lock the piston 12, 12', 12", 12''' in the closed position until the TPRD 2, 2', 2", 2''' is later operated. A confidence in security of high pressure vessels having the TPRD 2, 2', 2", 2''' is thereby improved.

It is surprisingly found that the cost of the TPRD 2, 2', 2", 2''' is not substantially different from existing "one way" thermal pressure relief devices. The design of the TPRD 2, 2', 2", 2''' can also be readily adjusted to cooperate with a variety of high pressure vessel designs.

While certain representative embodiments and details have been shown for purposes of illustrating the invention, it will be apparent to those skilled in the art that various changes may be made without departing from the scope of the disclosure, which is further described in the following appended claims.

What is claimed is:

1. A resettable thermal pressure relief device (TPRD), comprising:
    a housing having a first aperture and a second aperture allowing a fluid to flow through the housing;
    a piston slidably mounted in the housing and movable between an open position and a closed position, the piston sealing the second aperture when the piston is in the closed position; a lever disposed in the housing and having a first position which selectively militates against the piston moving into the open position;
    an actuator having a temperature sensitive material adapted to expand volumetrically with an increase in temperature, wherein the actuator facilitates a movement of the lever from a first position to a second position when a desired temperature is attained to allow the piston to move to the open position;
    a lever spring adapted to bias the lever and one of militate against a movement of the lever from the first position and move the lever to the second position; and
    a guide coupled to the lever spring, wherein the lever further has a cavity that receives the guide and the lever spring and facilitates a linear movement of the lever along the guide when the lever is moved from the first position to the second position.

2. The resettable TPRD according to claim 1, wherein the first aperture is formed adjacent the piston and permits a manual resetting of the piston to the closed position.

3. The resettable TPRD according to claim 1, wherein the housing has a cap and a body, the housing cap removably attached to the housing body to permit a manual resetting of the piston to the closed position.

4. The resettable TPRD according to claim 1, wherein the piston has an aperture formed therein facilitating fluid flow therethrough when the piston is in the open position.

5. The resettable TPRD according to claim 1, wherein the actuator includes a tube disposed adjacent a peripheral edge of the housing, wherein the temperature sensitive material is disposed in the tube and volumetrically increases with the increase in temperature to move the lever into the second position.

6. The resettable TPRD according to claim 1, wherein the actuator includes a bellows adjacent the lever, the bellows adapted to extend upon the volumetric increase of the temperature sensitive material and move the lever.

7. The resettable TPRD according to claim 1, wherein the second aperture of the housing selectively receives the piston in the closed position, the piston including a seal that forms a substantially fluid tight seal between the piston and the housing.

8. The resettable TPRD according to claim 1, wherein the housing is made of a thermally conductive material adapted to transfer heat to the temperature sensitive material.

9. The resettable TPRD according to claim 1, including a piston spring adapted to move of the piston from the closed position to the open position when the lever moves from the first position to the second position.

10. The resettable TPRD according to claim 1, wherein the actuator moves the lever from a first position to a second position when a desired temperature is attained, thereby allowing the piston to move to the open position.

11. The resettable TPRD according to claim 1, wherein the temperature sensitive material is a wax.

12. The resettable TPRD according to claim 1, wherein the first aperture is configured to direct the fluid flow therethrough away from the TPRD.

13. A resettable thermal pressure relief device (TPRD), comprising:
  a housing having a first aperture and a second aperture allowing a fluid to flow through the housing, the first aperture providing an access to reset the device after the fluid flow;
  a piston slidably mounted in the housing and movable between an open position and a closed position, the piston sealing the second aperture when the piston is in the closed position;
  a lever disposed in the housing and having a first position which selectively militates against the piston moving into the open position;
  a lever spring adapted to bias the lever and selectively militate against a movement of the lever from the first position;
  an actuator having a temperature sensitive material adapted to expand volumetrically with an increase in temperature, wherein the actuator moves the lever from a first position to a second position when a desired temperature is attained to allow the piston to move to the open position; and
  a guide coupled to the lever spring, wherein the lever further has a cavity that receives the guide and the lever spring and facilitates a linear movement of the lever along the guide when the lever is moved from the first position to the second position.

14. The resettable TRPD according to claim 13, wherein the body is configured to be threadably engaged with a high pressure vessel.

\* \* \* \* \*